United States Patent [19]
Iwabuchi

[11] Patent Number: 5,847,900
[45] Date of Patent: Dec. 8, 1998

[54] DISK CLAMPING DEVICE FOR MAGNETIC DISK DRIVE

[75] Inventor: Masanori Iwabuchi, Ibaragi, Japan

[73] Assignee: NEC Corporation, Tokyo, Japan

[21] Appl. No.: 821,636

[22] Filed: Mar. 20, 1997

Related U.S. Application Data

[63] Continuation of Ser. No. 544,410, Oct. 10, 1995, abandoned, which is a continuation of Ser. No. 153,963, Nov. 18, 1993, abandoned.

[30] Foreign Application Priority Data

Nov. 18, 1992 [JP] Japan ................................. 4-308392

[51] Int. Cl.[6] .................................................. G11B 17/02
[52] U.S. Cl. ................................. 360/98.08; 360/99.12
[58] Field of Search ........................... 360/98.01, 98.07, 360/98.08, 99.04, 99.05, 99.08, 99.12

[56] References Cited

U.S. PATENT DOCUMENTS

| | | | |
|---|---|---|---|
| 4,864,443 | 9/1989 | Peterson | 360/99.12 |
| 4,918,545 | 4/1990 | Scheffel | 360/98.08 |
| 4,945,432 | 7/1990 | Matsudaira et al. | 360/98.08 |
| 5,211,565 | 5/1993 | Krajewski et al. | 439/65 |
| 5,243,481 | 9/1993 | Dunckley et al. | 360/99.08 |
| 5,389,102 | 2/1995 | Green et al. | 606/143 |
| 5,390,059 | 2/1995 | Tokuyama et al. | 360/104 |

FOREIGN PATENT DOCUMENTS

| | | | |
|---|---|---|---|
| 63-103485 | 5/1988 | Japan | 360/99.12 |
| 2-166683 | 6/1990 | Japan | 360/98.08 |
| 4-102282 | 4/1992 | Japan | 360/98.08 |
| 4-139678 | 5/1992 | Japan | 360/98.08 |
| 4-184758 | 7/1992 | Japan | 360/98.08 |
| 4-195781 | 7/1992 | Japan | 360/98.08 |
| 4-222958 | 8/1992 | Japan | 360/98.08 |
| 4-255957 | 9/1992 | Japan | 360/98.08 |
| 4-259972 | 9/1992 | Japan | 360/98.08 |

OTHER PUBLICATIONS

IBM Technical Disclosure Bulletin; vol. 20, No. 10, Mar. 1078; Beye; "Eliminating Clamp–Induced Stresses in Disk Stacks".
IBM Technical Disclosure Bulletin; vol. 25, No. 3A, Aug. 1982; Prater; "Clamping of Magnetic Disk Stack with a Top Ring".
IBM Technical Disclosure Bulletin; vol. 22, No. 12, May 1980; Bosier et al; "Magnetic Disk Assembly".

*Primary Examiner*—Jefferson Evans
*Attorney, Agent, or Firm*—Sughrue, Mion, Zinn, Macpeak & Seas, PLLC

[57] ABSTRACT

A disk clamping device in a magnetic disk drive includes a clamper which presses an uppermost one of a plurality of magnetic recording disks and a clamping force transmission member which presses the clamper against the uppermost magnetic recording disk. A material having a small Young's modulus, such as a polymeric material and a super elastic material, is used for the clamper or the clamping force transmission member, or both of them. The device may include a shim whose Young's modulus is larger than that of the clamper. The clamping force of the clamper is transmitted to the uppermost disk through the shim. The arrangement makes it possible to reduce the variations in the clamping force caused by a lack of manufacturing precision or a change in temperatures and to provide a stable clamping force. The uniform clamping force reduces the occurrence of undulation in the disks otherwise caused by the circumferential clamping force differences in the clamper.

2 Claims, 2 Drawing Sheets

DISK CLAMPING DEVICE FOR MAGNETIC DISK DRIVE

This application is a continuation of application Ser. No. 08/544,410 filed Oct. 10, 1995, now abandoned, which is a continuation of application Ser. No. 08/153,963 filed Nov. 18, 1993, now abandoned.

BACKGROUND OF THE INVENTION

1. Field of the Invention

The present invention relates to a magnetic disk drive, and more particularly to a disk clamping device for positioning and fixing a plurality of magnetic data storage media (disks) on a hub rotated by a spindle motor, for use in a magnetic disk drive.

2. Description of the Related Art

In a conventional disk clamping device in a magnetic disk drive, for positioning a plurality of disks on a hub rotated by a spindle motor, each of the component parts of the device makes use of an elastic or spring material such as stainless steel, beryllium copper alloy and nickel alloy.

The elastic materials as used in the conventional disk clamping device generally have respective yield points and, since there develops plastic deformation if the given material is subjected to a stress the amount of which is beyond its yield point, it is required that such material be used within the range of stress (load) that does not exceed its yield point. Also, for the magnetic head for writing/reading data on the disk to float stably over the disk (since otherwise the data writing/reading characteristics are adversely affected), it is necessary that the distortion of the disks be suppressed to the minimum and, for this reason, the disks must be stably clamped or fixed to the hub with the minimum necessary clamping force. One of the defects in the above explained elastic materials as used in the conventional device is that, since their spring constants are large, they are sensitive to and easily affected by a lack of processing precision or a change in temperatures in component parts, so that there develop variations in the effective clamping forces.

Another factor which largely affects the distortion of the disks is that of precision in a surface of the clamper. The problem the conventional arrangement has encountered is that, when the disks are fixed to the hub by the conventional clamper, there has developed a wave-like distortion or undulation in the disks due to the circumferential clamping force differences in the clamper.

SUMMARY OF THE INVENTION

It is, therefore, an object of the present invention to overcome the problems existing in the conventional arrangement and to provide an improved disk clamping device for the magnetic disk drive.

It is another object of the invention to reduce the variations in a clamping force in the device caused by a lack of manufacturing precision or a change in temperatures, and to provide a stable clamping force.

It is a further object of the invention to reduce the occurrence of undulation in the disks caused by the circumferential clamping force differences in the clamper, thereby stabilizing the data writing/reading characteristics.

According to one aspect of the invention, there is provided a disk clamping device in a magnetic disk drive, for positioning and fixing a plurality of magnetic recording disks provided with a spacer therebetween on a hub rotated by a spindle motor, the device comprising:

a damper which presses an uppermost one of the plurality of magnetic recording disks;

a clamping force transmission member which presses the damper against the uppermost magnetic recording disk, at least one of the damper and the clamping force transmission member being constituted by a material having a small Young's modulus.

According to another aspect of the invention, there is provided a disk clamping device which is similar to the above but which further includes a shim, and the damper presses the uppermost one of the magnetic recording disks through the shim.

In the device according to the invention, a material having a small Young's modulus, such as a high polymer material and a super elastic material, is used for the clamper or the clamping force transmission member, or both of them.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the accompanying drawings.

Figure 1:
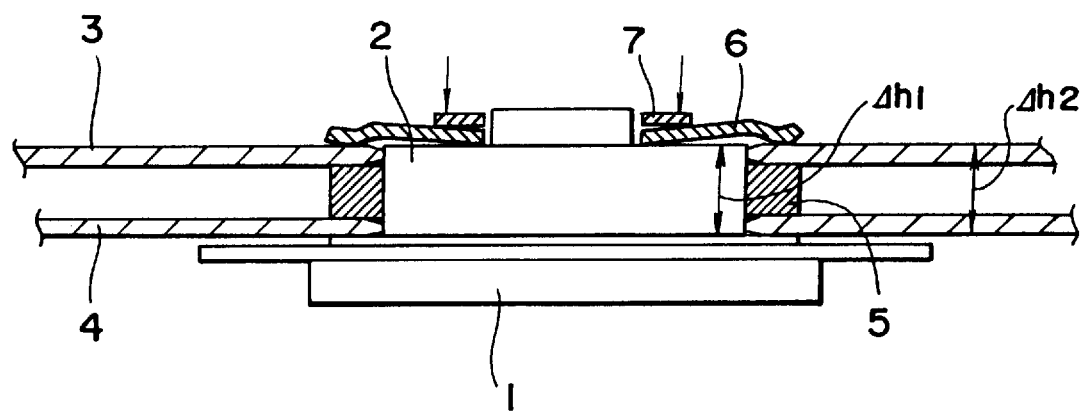
FIG. 1 is a diagrammatic sectional view of a disk clamping device for a magnetic disk drive of a first embodiment according to the invention.
Figure 3:
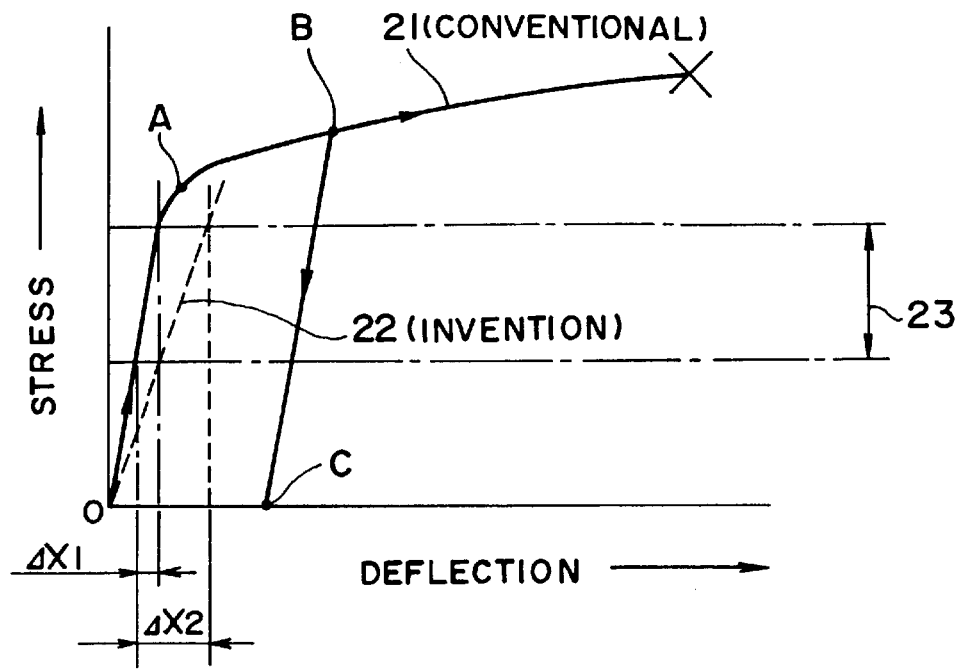
FIG. 3 is a graph showing the relationship in characteristics between stress and deflection of the clamper in comparison with that in a conventional disk clamping device, for an explanation of operational theories of the present invention.
Figure 4:
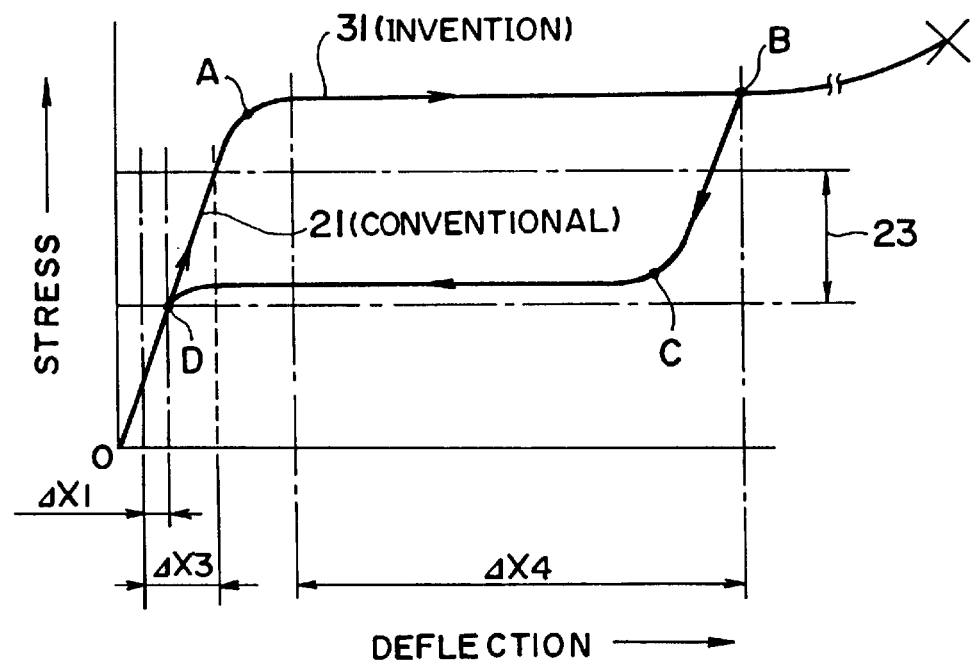
FIG. 4 is a graph showing the relationship in characteristics between stress and deflection in an example wherein a super elastic material is used as a material of the clamper.

FIG. 1 shows in schematic sectional view a disk clamping device of a first embodiment according to the invention. For purposes of explaining operational theories relating to the invention, FIG. 3 shows in a graph the characteristic relationship between the stress and the deflection of the clamper according to the invention in comparison with that in the conventional device. FIG. 4 shows also in a graph the characteristic relationship between the stress and the deflection of the clamper when a super elastic material is used as a clamper material according to the first embodiment of the invention.

In the first embodiment shown in FIG. 1, a hub 2 fixed to a spindle motor 1 for rotation unitarily with the spindle motor 1 carries two magnetic disks 3 and 4 with a spacer 5 disposed therebetween. For fixing the disks 3 and 4 to the hub 2, a clamper 6 is provided on the upper disk 3 and a clamping force transmission member 7 is provided on the clamper 6. By the clamper 6 being pressed by the clamping force transmission member 7, the disks 3 and 4 are firmly clamped and fixed to the hub 2.

The clamper 6 must be firmly secured to the hub 2 in such a way that the disks 3 and 4 as well as the spacer 5 do not move when subjected to any external impact or vibration.

Also, the extent of elasticity or deflection of the damper 6 must be large enough to absorb any dimension errors accumulated during the assemblage of the respective component parts.

The clamping force transmission member 7 is a member which produces clamping force for the damper 6 to fasten and fix the disks 3 and 4 as well as the spacer 5 to the hub 2. The occurrence of the variations in the clamping forces is mainly caused by dimension errors $\Delta h1$ in the height of the portion of the hub 2 at which the disks are mounted by and a cumulative value $\Delta h2$ of dimension errors in the disks 3 and 4 and the spacer 5 as well as the clamper 6. In the worst case, the amount of deflection of the damper 6 varies by ($\Delta h1+\Delta h2$) and the clamping power thus fluctuates.

In the conventional disk clamping device employing a spring material such as stainless steel, beryllium copper alloy and nickel alloy, it is seen in a line 21 of FIG. 3 that the stress—deflection curve includes a linear portion (between point 0 and yield point A) and this is the range in which the damper exhibits a spring elasticity and restores to the original state when the load is released. This range is an "elasticity region".

When the load is increased beyond the yield point A, the state of the damper suddenly changes and the ratio of an increase in the deflection with respect to an increase in the stress also suddenly becomes large. If this state continues further, the damper breaks at point E. The range up to this point from the yield point A is a "plasticity region". When the load is removed within this region, for example, at point B in the graph, the load release takes place in parallel to the linear portion B–C in the elasticity region and the permanent deformation 0—C remains in place.

If a sudden change takes place in the load (due to, for example, external impact or vibration) under the state in which the load is beyond the elasticity region, the damper 6 can no longer maintain the necessary clamping force since it has already lost its spring elasticity.

In the damper materials of the conventional device, the Young's modulus is large with a large slanting angle of the linear portion (0—A). Thus, when such damper is used in its elasticity region, the clamping force largely fluctuates due to dimension errors of the related component parts.

In order to solve the above problem in the conventional device, the damper in this embodiment according to the invention makes use of a material in which the Young's modulus is small, for example, a polymeric material or a super elastic material. Examples of the super elastic material are supper elastic metal alloy such as Fe-Pt (23~25at % Pt), In-Ti (18~23at % Ti), and Ti-Ni(49~51at % Ni), products under the trademark "MEMOALLOY" of Tokin Co. Ltd., Japan.

Thus, as shown by the dotted line 22 in FIG. 3, the slanting angle of the linear portion thereof can be made small and the range of changes in the amount of deflection in a use-permissible region 23 can be enlarged to a range from $\Delta X1$ to $\Delta X2$. In this way, it is possible to obtain and maintain stably the necessary clamping force.

The state wherein a super elastic material is used as a material for the damper 6 is shown in FIG. 4. The super elastic material has a smaller Young's modulus (with the linear portion gently slanting) as compared with that in the material used in the conventional arrangement so that, even when used within the use permissible region 23 the range of changes in the amount of deflection is enlarged to a range from $\Delta X1$ (the deflection range for the conventional arrangement, line 21) to $\Delta X3$. Thus, the necessary clamping force is stably obtained.

With the super elastic material, when the load is further increased beyond the yield point A, the region A–B becomes linear, and in this region the stress is constant even when there is an increase in the deflection. In this state (for example, at point B) if the load is removed, the clamper 6 restores to its original state along the curve B→C→D→0 so that no permanent deformation remains.

Thus, it is by use of the region A–B that the constant stress, that is, the constant clamping power, can be stably obtained irrespective of any changes in the amount of deflection. In this case, the range of changes in the amount of deflection is enlarged from $\Delta X1$ to $\Delta X4$. Therefore, any cumulative value of dimension errors in the related component parts can be completely absorbed and the stable clamping force can be obtained.

The material having a small Young's modulus as explained above has characteristics such that the clamper itself can easily be deflected when the clamping force is caused to be biased due to a lack of precision in the surface of the clamper, so that the clamper can correct the bias in its clamping force more effectively than in the material having a large Young's modulus.

While the above explained embodiment relates to an example wherein a high polymer material or a super elastic material having a small Young's modulus is used as a material of the damper 6, the same or similar effect can be obtained when such a polymeric material or a super elastic material is used as a material of the clamping force transmission member 7. The same is also true when such a high polymer material or a super elastic material is used as materials of both the damper 6 and the clamping force transmission member 7.

Figure 2:
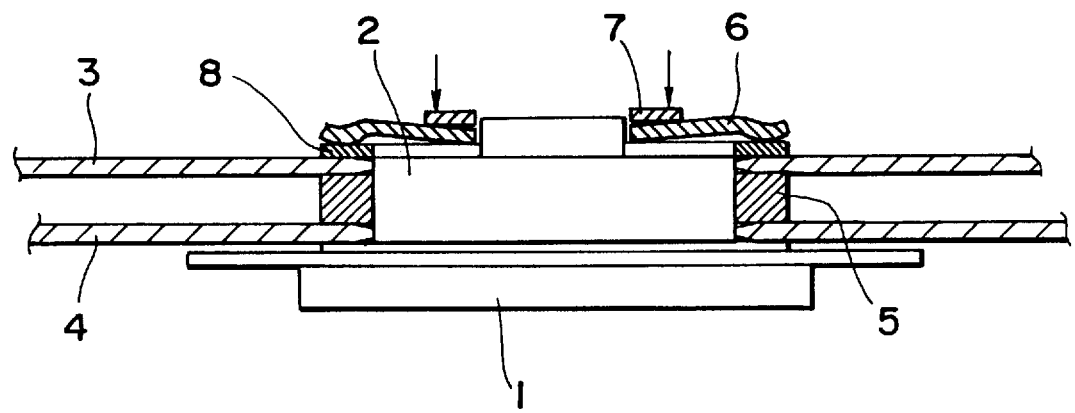
FIG. 2 is a diagrammatic sectional view of a disk clamping device for a magnetic disk drive of a second embodiment according to the invention.

FIG. 2 shows in schematic sectional view a disk clamping device of a second embodiment according to the invention.

In the second embodiment shown in FIG. 2, a shim 8 is provided between the upper disk 3 and the damper 6 of the device of the first embodiment shown in FIG. 1. The shim 8 is made of a material whose Young's modulus is larger than that of the polymeric material or the super elastic material used as the material of the damper 6. This causes the clamping force to the disks 3 and 4 to be uniform which reduces the undulation of the disks 3 and 4. Other arrangements in this second embodiment are the same as those of the first embodiment shown in FIG. 1.

Examples of combinations of the materials of the shim 8 and the damper 6 are given in the following table.

TABLE

| Shim | Clamper |
| --- | --- |
| Fine ceramics | General elastic materials |
|  | Stainless steel |
|  | Beryllium copper alloy |
|  | Low elastic materials |
|  | Aluminum alloy |
|  | polymeric material |
| Stainless steel | Beryllium copper alloy |
|  | Aluminum alloy |
|  | polymeric material |
| Aluminum alloy | polymeric material |

The surface of the shim 8 requires high precision. However, since the shim 8 is in a thin plate with a simple shape, it is not difficult to produce such shim 8 having high surface precision. When such shim 8 is provided between the damper 6 and the upper disk 3, the clamping force of the damper 6 is transmitted to the upper disk 3 through the shim 8 and, since the shim 8 and the disk 3 are uniformly or evenly in contact with each other, the power transmitted to the disks 3 and 4 is uniform. Thus, there occurs no undulation in the disks 3 and 4.

The above explained second embodiment relates to an example wherein a high polymer material or a super elastic material having a small Young's modulus is used as a material of the damper 6. The same or similar effect can be obtained when such a high polymer material or a super elastic material is used as a material of the clamping force transmission member 7. The same is also true when such a high polymer material or a super elastic material is used as materials of both the damper 6 and the clamping force transmission member 7.

One advantage in the above explained disk clamping device according to the invention is that, by using a high polymer material or a super elastic material having a small Young's modulus as a material of the damper and/or the clamping force transmission member for fastening the disks to the hub, the variations in the clamping force caused by a lack of manufacturing precision or a change in temperatures is reduced which provides a stable clamping force. Another advantage is that since the clamping force can be made uniform on clamping, it is possible to reduce the occurrence of undulation in the disks caused by the circumferential clamping force differences, which stabilizes the data writing/reading characteristics.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A disk clamping device in a magnetic disk drive, for positioning and fixing a plurality of magnetic recording disks provided with a spacer therebetween on a hub rotated by a spindle motor, said disk clamping device comprising:

a shim;

a clamper which presses an uppermost one of said plurality of magnetic recording disks through said shim; and a clamping force transmission member which presses said clamper against said uppermost magnetic recording disk, wherein at least one of said clamper and said clamping force transmission member being constituted by a super elastic material, and said shim being constituted by a material having a Young's modulus larger than that of said clamper.

2. A disk clamping device for magnetic disk drive according to claim 1, in which said at least one of said clamper and said clamping force transmission member is a super elastic material.

* * * * *